(12) United States Patent
Meredith et al.

(10) Patent No.: US 10,261,832 B2
(45) Date of Patent: Apr. 16, 2019

(54) SORTING APPARATUS

(71) Applicants: AT&T Mobility II LLC, Atlanta, GA (US); AT&T Intellectual Property I, L.P., Atlanta, GA (US)

(72) Inventors: Sheldon K. Meredith, Roswell, GA (US); William C. Cottrill, Canton, GA (US); Jeremy Fix, Acworth, GA (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 352 days.

(21) Appl. No.: 14/957,049

(22) Filed: Dec. 2, 2015

(65) Prior Publication Data

US 2017/0161113 A1    Jun. 8, 2017

(51) Int. Cl.
*G06F 17/30* (2006.01)
*G06F 9/50* (2006.01)

(52) U.S. Cl.
CPC ...... *G06F 9/5038* (2013.01); *G06F 17/30595* (2013.01)

(58) Field of Classification Search
CPC .................................................. G06F 17/30595
See application file for complete search history.

(56) References Cited

U.S. PATENT DOCUMENTS

| | | | |
|---|---|---|---|
| 3,931,612 A | 1/1976 | Stevens et al. | |
| 4,030,077 A | 6/1977 | Florence et al. | |
| 4,132,314 A | 1/1979 | von Beckmann et al. | |
| 4,298,957 A | 3/1981 | Duvall et al. | |
| 4,261,034 A | 4/1981 | Saccomano | |
| 4,464,732 A | 8/1984 | Clark | |
| 4,750,149 A | 6/1988 | Miller | |
| 4,907,186 A | 3/1990 | Racey | |
| 4,939,639 A | 7/1990 | Lee et al. | |
| 5,179,699 A | 1/1993 | Iyer et al. | |
| 5,218,700 A | 6/1993 | Beechick | |
| 5,600,825 A | 2/1997 | Atkins et al. | |
| 5,905,387 A | 5/1999 | Chinosi et al. | |
| 5,917,828 A | 6/1999 | Thompson | |
| 6,073,128 A | 6/2000 | Pongracz et al. | |
| 6,188,251 B1 | 2/2001 | Priemer et al. | |
| 6,198,311 B1 | 3/2001 | Shi et al. | |

(Continued)

OTHER PUBLICATIONS

U.S. Appl. No. 14/869,374, filed Sep. 29, 2015, entitled "Sorting System," naming Sheldon K. Meredith and William C. Cottrill as inventors.

(Continued)

*Primary Examiner* — Syed H Hasan
(74) *Attorney, Agent, or Firm* — Zagorin Cave LLP

(57) ABSTRACT

A sorter receives a list of elements to be sorted. An element of the list is supplied to a selected one of a plurality of processing units to be processed. The selected one of the processing units sends the element to one of a plurality of list element cells, which rank orders the elements among other elements in the same list element storage as well as storing the position of each element from the original list. Each of the plurality of list element cells processes and stores a different range of element values. The element being processed is stored in sorted order in the list element cell that has an element value range that encompasses the value of the element of the list.

21 Claims, 4 Drawing Sheets

(56) References Cited

U.S. PATENT DOCUMENTS

| | | |
|---|---|---|
| 6,199,084 B1 | 3/2001 | Wiseman |
| 6,289,509 B1 | 9/2001 | Kryloff |
| 6,310,740 B1 | 10/2001 | Dunbar |
| 6,366,911 B1 | 4/2002 | Christy |
| 6,741,999 B2 | 5/2004 | Wagner |
| 6,757,766 B1 | 6/2004 | Hutner et al. |
| 6,775,667 B1 | 8/2004 | Lewis et al. |
| 7,092,901 B2 | 8/2006 | Davis et al. |
| 7,177,319 B2 | 2/2007 | Buchert et al. |
| 7,197,498 B2 | 3/2007 | Perloff |
| 7,233,895 B2 | 6/2007 | Petty |
| 7,277,606 B1 | 10/2007 | Sakai |
| 7,450,588 B2 | 11/2008 | Chang |
| 7,467,138 B2 | 12/2008 | Carroll |
| 7,689,541 B1 | 3/2010 | Le Grand |
| 7,711,603 B2 | 5/2010 | Vanker |
| 7,796,583 B1 | 9/2010 | Enderby |
| 7,870,159 B2 | 1/2011 | Carroll |
| 7,975,120 B2 | 7/2011 | Sabbatini, Jr. et al. |
| 8,014,270 B2 | 9/2011 | Halford et al. |
| 8,094,157 B1 | 1/2012 | Le Grand |
| 8,098,718 B2 | 1/2012 | Sienko et al. |
| 8,239,231 B2 | 8/2012 | Lian |
| 8,407,098 B2 | 3/2013 | Davydov |
| 8,700,614 B1 | 4/2014 | Diller et al. |
| 8,704,842 B1 | 4/2014 | Gaddy et al. |
| 8,832,115 B2 | 9/2014 | Smintina et al. |
| 8,964,771 B2 | 2/2015 | Tabatabaee et al. |
| 9,106,238 B1 | 8/2015 | Cronie et al. |
| 2002/0040362 A1 | 4/2002 | Lewis |
| 2002/0165707 A1 | 11/2002 | Call |
| 2002/0174222 A1* | 11/2002 | Cox .................. G06Q 30/02 709/224 |
| 2003/0061597 A1* | 3/2003 | Curtis ................ G06F 11/076 717/128 |
| 2005/0193174 A1 | 9/2005 | Arimilli |
| 2006/0123014 A1 | 6/2006 | Ng |
| 2006/0176901 A1 | 8/2006 | Terai et al. |
| 2007/0174124 A1 | 7/2007 | Zagofsky et al. |
| 2007/0279274 A1 | 12/2007 | Hsieh |
| 2008/0048641 A1 | 2/2008 | Makino |
| 2008/0208951 A1* | 8/2008 | Gotz .................... B07C 3/14 709/201 |
| 2008/0211544 A1 | 9/2008 | Makino |
| 2008/0215584 A1* | 9/2008 | Furusho ........... G06F 17/30486 |
| 2009/0103501 A1 | 4/2009 | Farrag |
| 2009/0163223 A1 | 6/2009 | Casey |
| 2009/0302232 A1 | 12/2009 | Grosholz |
| 2010/0031003 A1* | 2/2010 | Chen .................. G06F 9/30021 712/30 |
| 2010/0312995 A1* | 12/2010 | Sung ..................... G06N 3/006 712/220 |
| 2011/0093546 A1 | 4/2011 | Rubingh |
| 2013/0314101 A1 | 11/2013 | Belet |
| 2013/0346425 A1* | 12/2013 | Bruestle ........... G06F 17/30345 707/752 |
| 2014/0006665 A1 | 1/2014 | Amano et al. |
| 2014/0164652 A1 | 6/2014 | Pettijohn |
| 2014/0266487 A1 | 9/2014 | Vaishnav |
| 2014/0269684 A1 | 9/2014 | Fortune et al. |
| 2014/0281390 A1 | 9/2014 | Boland et al. |
| 2015/0134795 A1 | 5/2015 | Theimer et al. |
| 2015/0169585 A1 | 6/2015 | Korst et al. |
| 2017/0325065 A1 | 11/2017 | Azam et al. |

OTHER PUBLICATIONS

U.S. Appl. No. 14/924,005, filed Oct. 27, 2015, entitled "Analog Sorter," naming Sheldon K. Meredith and William C. Cottrill as inventors.

U.S. Appl. No. 14/957,035, filed Dec. 2, 2015, entitled "Adaptive Alphanumeric Sorting Apparatus," gaming Sheldon K. Meredith, William C. Cottrill, and Rick K. Tipton as inventors.

Choi, Sung-Soon and Moon, Byung-Ro, "Isomorphism, Normalization, and a Genetic Algorithm for Sorting Network Optimization," Proceedings of the Genetic and Evolutionary Computation, Gecco, 2002, pp. 327-334.

Dewdney, A.K., "Computer Recreations—On the Spaghetti Computer and Other Analog Gadgets for Problem Solving," Scientific American, pp. 19-26, Jun. 1984.

Rovetta, S. and Zunino, R., "Minimal-connectivity circuit for analogue sorting," IEE Proc.-Circuits Devices Syst., vol. 146, No. 3, Jun. 1999, pp. 108-110.

King, Huanlai and Qu, Rang, "A Nondominated Sorting Genetic Algorithm for Bi-Objective Network Coding Based multicast Routing Problems," Information Sciences, 233 (2013), pp. 23 pages.

Non-final Office action dated Apr. 4, 2018 for U.S. Appl. No. 14/869,374, filed Sep. 29, 2015, 36 pages.

Non-final Office action dated Jan. 8, 2018 in U.S. Appl. No. 14/957,035, filed Dec. 2, 2015, 20 pages.

* cited by examiner

| Memory Address | Value | Positional Counter | Additional Instances | Memory Address |
|---|---|---|---|---|
| AB00012300 | | | | |
| AB00012301 | 1 | 3 | 0 | NULL |
| AB00012302 | | | | |
| AB00012303 | | | | |
| AB00012304 | | | | |
| AB00012305 | | | | |
| AB00012306 | | | | |
| AB00012307 | | | | |
| AB00012308 | | | | |
| AB00012309 | | | | |
| AB0001230A | | | | |
| AB0001230B | | | | |
| AB0001230C | 5 | 1 | 0 | NULL |
| AB0001230D | | | | |
| AB0001230E | | | | |
| AB0001230F | | | | |
| AB00012310 | 7 | 2 | 1 | FB00012300 |
| AB00012311 | | | | |
| AB00012312 | | | | |
| AB00012313 | | | | |
| AB00012314 | | | | |
| AB00012315 | | | | |
| AB00012316 | | | | |
| AB00012317 | | | | |
| AB00012318 | | | | |
| AB00012319 | | | | |
| AB0001231A | | | | |
| AB0001231B | | | | |
| AB0001231C | | | | |

⋮

| FB00012300 | 114 |
|---|---|

Fig. 3

SORTING APPARATUS

CROSS REFERENCE TO RELATED APPLICATIONS

This application is related to U.S. patent application Ser. No. 14/957,035 entitled "Adaptive Alphanumeric Sorting Apparatus," naming Sheldon K. Meredith et al. as inventors, filed the same day as this application, which application is hereby incorporated herein by reference.

BACKGROUND

Field of the Disclosure

This application relates to sorting and in particular to sorting using multiple processing units.

Description of the Related Art

The widely accepted value for the minimum number of comparison operations to sort a large list of N elements is N log 2(N). Sorting a very large list of one billion items, for example, still requires roughly 30B comparisons. Each of these comparisons can also require many clock cycles of the computing system. 30B comparisons might actually take 300B clocked operations. In Big Data analytics, weather prediction, nuclear calculations, astrophysics, genetics, public health, and many other disciplines, there is a frequent need to sort very large datasets. This further implies computational resources than can literally fill buildings with racks of servers to service these needs. To the extent one can improve on this N log 2(N) limitation on sorts (with multiple operations per sort), one can improve on the capital infrastructure and associated operational costs for computing systems.

SUMMARY OF EMBODIMENTS

Accordingly, in one embodiment, a sorting apparatus to sort a list of elements includes ingest logic to receive the list of elements to be sorted. A first communication channel supplies elements of the list from the ingest logic to a plurality of parallel processing units. Selection logic selects one of the plurality of processing units to process an element of the list as it is supplied from the ingest logic to the first communication channel. The plurality of parallel processing units also communicates with a plurality of list element cells via a second communications bus. Each of the list element cells receives a list element from one of the plurality of processing units and stores the element in rank order within memory dedicated to the list element cell and within a defined range of element values that are distinct and non-overlapping with the element value ranges defined for other list element cells. The rank ordering within the list element cell necessarily involves processing, so the list element cell is not just a passive storage device. During processing, the processing unit that is selected to process a list element, stores information associated with the list element in the list element cell having an element value range that encompasses the value of the element. The memory allocated to a list element cell may be a default size or may be based upon the known size of the list of elements and known characteristics of the elements such as alphanumeric elements of fixed or arbitrary length, integers, or decimal elements. The allocated memory may be dynamically adjustable during list element sorting if the allocated memory is determined to be insufficient during processing. The list of elements can include metadata such as the list length and element types which may also identify character sets as may apply to symbols, alphanumeric characters, or character sets for various other languages.

A method for sorting a list of elements includes receiving a list of elements to be sorted. An element of the list is supplied to a selected one of a plurality of processing units to be processed. The selected one of the processing units sends the element of the list and any associated information or metadata associated with the element to one of a plurality of list element cells having a defined element range encompassing the list element. Other list element cells, to which the list element is not sent, necessarily have defined element value ranges not encompassing the list element.

In another embodiment, a sorting apparatus to sort a list of elements includes a plurality of list element cells, each of which rank sorts and stores elements within its defined range of list elements. A first communication link supplies elements of the list to the processing units. Select logic selects respective ones of the processing units to process the list element. A plurality of processing units are coupled to the plurality of list element cells via a secondary communication link. Each of the list element cells are accessible to each of the processing units via the secondary communication link. The selected processing unit inspects the element value ranges of the list element cells and forwards the list element to the single list element cell having an element value range encompassing the value of the list element. Monitor logic monitors utilization of the list element cells and allocates one or more additional list element cells when the utilization indicates one of the list element cells is being utilized by a predetermined amount more than one or more of other list element cells.

BRIEF DESCRIPTION OF THE DRAWINGS

The present invention may be better understood, and its numerous objects, features, and advantages made apparent to those skilled in the art by referencing the accompanying drawings.

FIG. 3 illustrates how a CPU stores values in a list element storage structure.

The use of the same reference symbols in different drawings indicates similar or identical items.

DETAILED DESCRIPTION

Figure 1:
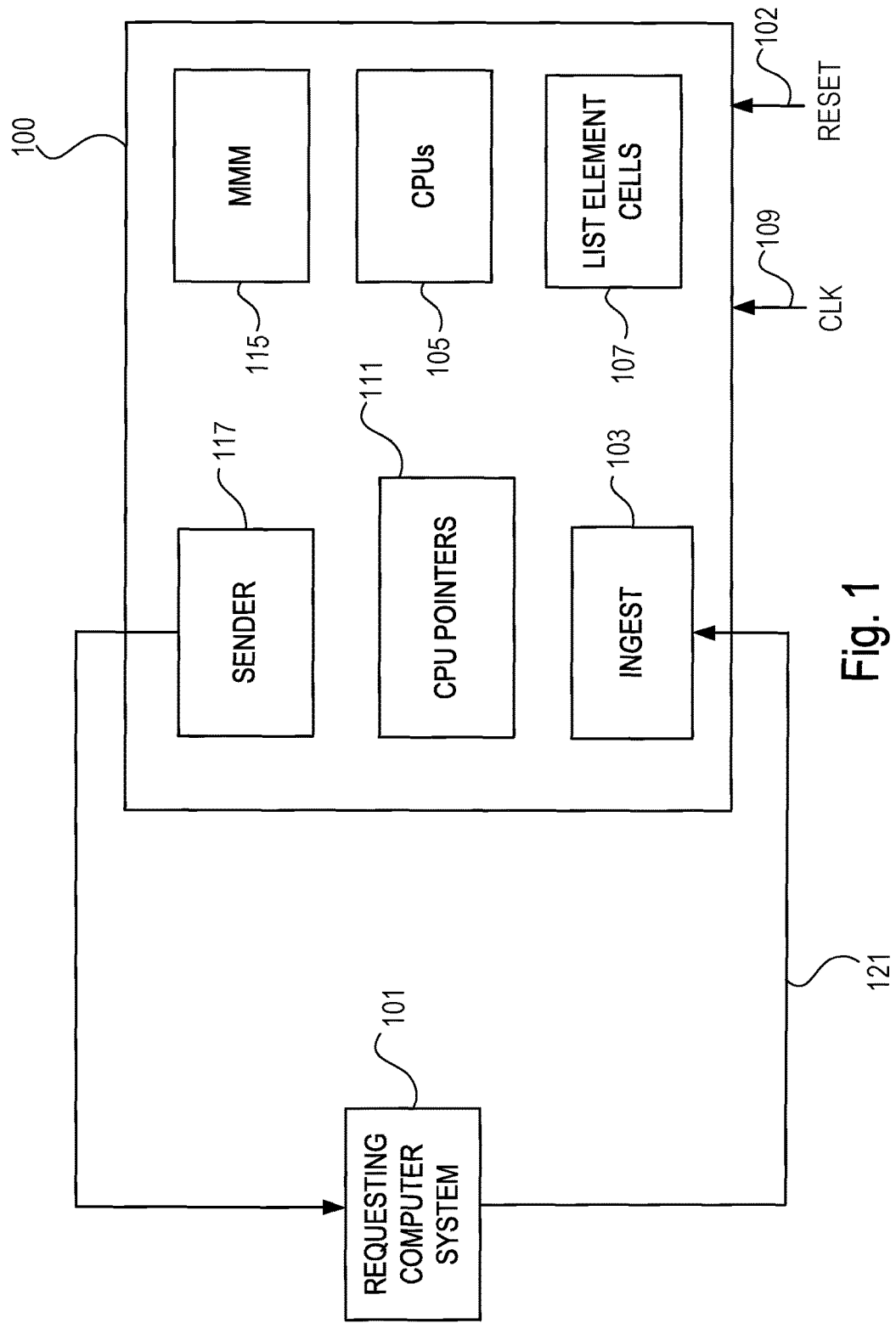
FIG. 1 illustrates a sorter system according to an embodiment.

A sorting apparatus is disclosed that receives a list of numeric, alphanumeric, or symbolic elements (or any list than can be numerically represented) from a requesting system. Referring to FIG. 1, the sorting apparatus 100 ingests a list of elements (list elements) to be sorted that is supplied by a requesting computer system 101. Primary sections of the sorting apparatus 100 include a reset line (RESET) 102, a list elements ingestion function (INGEST) 103, a set of central processing units (CPUs) 105, list element cells 107, a clocking mechanism (CLOCK) 109, the CPU pointer (CPU_POINTERS) 111, a median/mean/mode (MMM) function 115, and a sending function (SENDER) 117. The primary sections of the sorting apparatus are discussed in more detail herein. Prior to the requesting computer system 101 sending the list of elements to the sorting apparatus 100, a reset command may be provided that resets the entire apparatus to a default state. The reset command can be sent on the same communication path 121 as the list or on a separate path 102. The reset precedes the sending of the list of elements. RESET may cause all list element cells to be deallocated or a default set of list element cells to be allocated with null contents as a default state.

Figure 2:
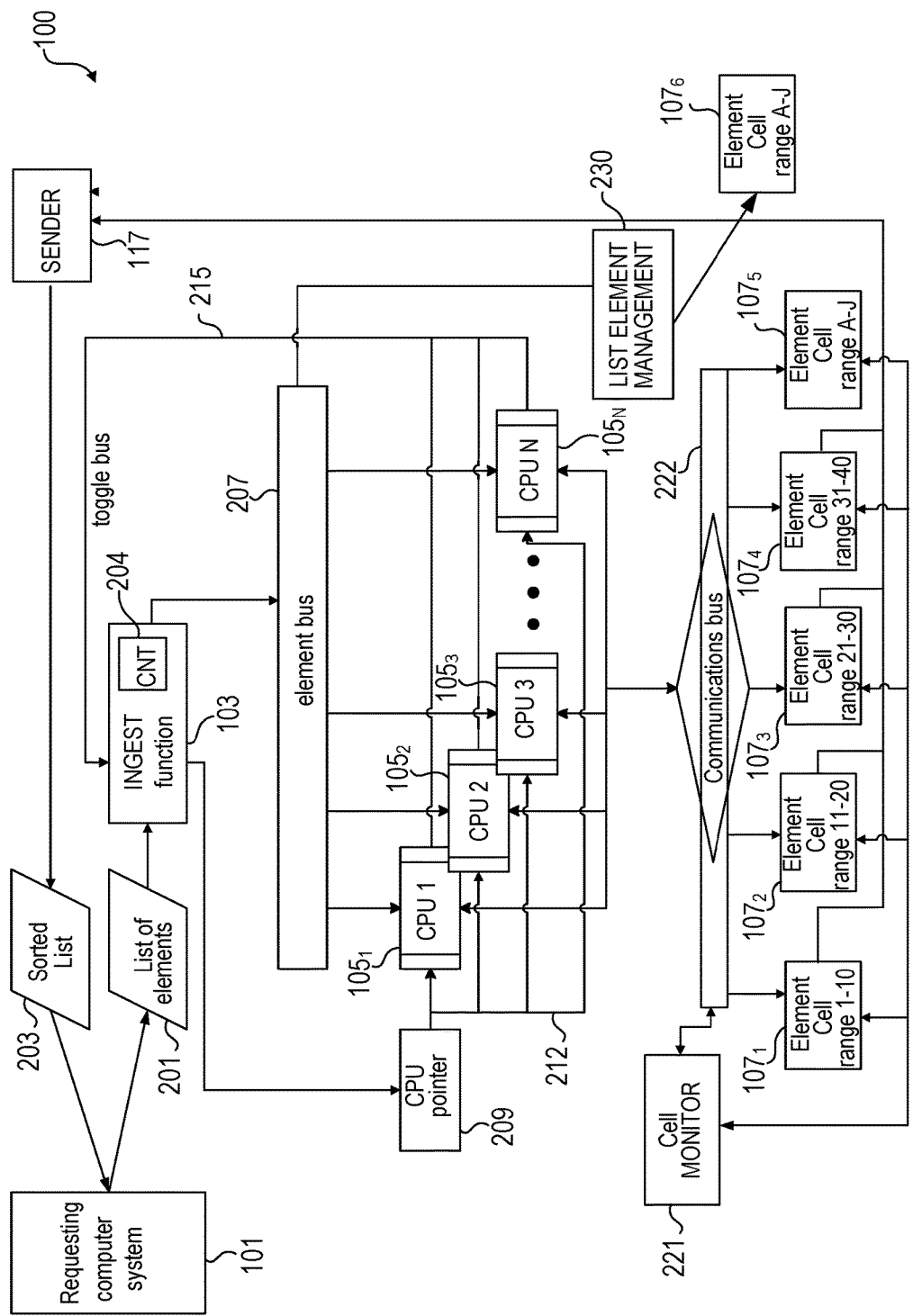
FIG. 2 illustrates additional details of an embodiment of the sorter apparatus.

Referring to FIG. 2, additional details of the sorting apparatus 100 are illustrated. The requesting computing system 101 sends a list of elements 201 to the sorting apparatus and receives back the sorted list 203. The list of elements may be sent serially and may be buffered in a storage (not shown) in the INGEST function 103. The INGEST function 103 receives (ingests) the elements of the list and supplies the list, one element at a time to the element bus 207. When operating on the first element in the list, CPU pointer 209 identifies a "current" CPU to process the element and sets the address of the current CPU on a communications bus 212 that is shared by all CPUs $105_1$, $105_2$, $105_3$, and $105_N$ to select the current CPU. Note that the CPUs 105 are programmed processing units and may be central processing units or any processing unit having the ability to perform the functions described herein. The term CPU will be used herein for convenience. Note that each of the CPUs has associated memory to store software to be executed by the CPUs to help implement the functionality described herein.

The selected CPU observes its own address on the communications bus 212 and may toggle a hardware interrupt line 215 prior to capturing the element supplied by INGEST 103 on the element bus 207 shared by all the CPUs, but only if the CPU is not preoccupied with other operations and therefore temporarily unavailable. Note that the element bus 207 is shown as a shared bus but in other embodiments the INGEST function 103 may have a high speed point to point communication link with each CPU. Further, the communication bus 212 may be part of the protocol of the element bus 207. For example, the processor may be selected based on an address supplied by the element bus 207. After the current CPU receives the element, the current CPU toggles the interrupt line 215 or otherwise notifies the INGEST function that the element has been received by the current CPU so as to notify the INGEST function that INGEST may supply the next element on the shared element bus 207 and cause the CPU pointer to select the next CPU in the set of CPUs. The CPU pointer 209 in one embodiment selects the CPUs in a round robin manner. The INGEST function 103 and the CPU pointer function 209 are shown as separate but may physically be combined in logic, e.g., in a processing unit such as a microcontroller or in one core of a multi-core computer system. If a selected CPU is unavailable for assignment as indicated via the communication bus 212, the CPU pointer function may increment the CPU pointer which causes the busy CPU to be skipped and the next CPU within the set of CPUs becomes the "current" CPU. The ability to skip a busy CPU is not limited to a single skip, thereby enabling a linear search mechanism to find the next available CPU to process the list element.

Each list element cell 107 ($107_1$, $107_2$, $107_3$, $107_4$, $107_5$) contains its own processing functionality for rank ordering operations within the cell and is allocated a range of memory locations for storing list elements within a range of element values that is unique to the list element cell. There are a plurality of list element cells 107, each with a different element value range that may be of approximately or identically the same size. For example, referring to FIG. 2, list element cells $107_1$ to $107_5$ are shown to have element value ranges of 1-10, 11-20, 21-30, 31-40, and A-J. That means that list element cell $107_1$ rank orders and stores information for elements having values including and between 1-10, list element cell $107_2$ rank orders and stores information for list elements ranging between 11-20, etc. Note that the particular element value ranges shown in FIG. 2 are simply examples and the numbers of list element cells and/or element value ranges may be much larger to sort lists with millions or billions of elements.

In an embodiment the INGEST logic 103 includes a counter 204 that increments with every element that is placed by INGEST 103. The count value corresponds to the original position of the list element in the list. The INGEST logic provides the count value to the CPU when an element is supplied to the CPU on the list element communication bus 207. That allows the element and its corresponding positional counter to be retained as a pair throughout processing and thus retain positional information if desired. Thus, if the $119^{th}$ element of the list is being processed, that element and the value 119 are provided to the CPU. In other embodiments, the positional information may not be tracked.

Each list element cell receives list elements, each with an associated positional count value which is the positional reference of the associated element within the original list of elements. Each list element cell rank orders incoming elements and stores all list position count values for each distinct element. Any element presented multiple times to the list element cell will retain multiple positional count values to preserve the original positional information. The list elements are stored such that the element is an index into a database or memory table which returns one or more counter values for the element. If there is exactly one positional count value observed for an element, that count value is returned when the database or memory table is indexed with the element. If there are multiple positional count values for an element, the list element cell dynamically allocates memory to store the second or higher counters. The indexed database or memory table retains the counter value for the first observed instance of the element, a count of additional instances of the same element, and a starting memory address to the memory location where one or more additional positional count values for other observed instances of the element are stored.

When the current CPU loads an element from the element communication bus, the current CPU looks for a list element cell having an element value range containing the element. The list element cell element value ranges are provided to all CPUs by the list element management functionality which retains the configuration information for each list element cell. For example, if the element being processed by the current CPU is 25, the CPU identifies the list element cell $107_3$ as having an element value range containing that element.

If no list element cell exists having an element value range including the element, the current CPU notifies the list element cell management function to create a new list element cell. In that case, the list element cell management function assigns a range of element values for this new list element storage structure per a governing rule set and notifies all CPUs of the revised configuration information. For instance, if the value of the loaded element is 55, and assuming the current available element value ranges are as shown in FIG. 2, the list element cell management function may create a new list element cell with an element value range of 51-60 according to a governing rule set that allocates list element storage structures in sizes of 10. In another example of a governing rule set, any new list element cell might have a multiple of a range of 65,536 (256 squared) alphanumeric values. By allocating memory to the list element cells dynamically and as needed, memory is not allocated for elements that do not and perhaps will not exist for any sorting operation. Alternatively, memory may be allocated in a default configuration in response to reset and be dynamically allocated if the default configuration fails to provide the needed element value ranges. In another embodiment, list element cells are allocated according to list size and list element types since some types of elements require different amounts of storage per element.

When a CPU attempts to send a list element to a list element cell, the list element cell may be busy processing a prior value, thereby preventing the CPU from sending its element. That is the reason why a CPU may not always be available to accept the next list element from the incoming list element communication bus. The CPU must complete its operation with the target list element cell. If the current CPU can send the list element and its associated positional count value to the list element cell, it does so and then the CPU makes itself available to receive another list element from the list element communication bus.

At the onset of list element processing, each list element cell has no entries. To rank order and store an element, the local processor assigned to the list element cell intelligently (using non-linear techniques) approximates where to place the new element in memory. The element is used along with the list element cell's defined element value range and allocated memory range to interpolate a memory address for the element. The element value range in the list may not be known unless the range of the list is specified in list metadata. One embodiment assumes uniform element distribution and uses linear interpolation within the allocated memory range to insert elements, which would automatically create gaps in memory locations. For instance, if it is necessary to insert elements ranging from 0 to 255, and 65,536 memory addresses are allocated, the value "52" is attempted to be placed at memory position ROUNDUP((52/255)*65536). The closest elements above and below this memory position are then inspected to ensure the new element is between higher and lower stored elements. If not, or if the target memory location is already occupied, we must move the new element in one direction until it is between stored elements. When one is finally in proximity to the desired value, a local linear search is faster than continually computing interpolations and extrapolations. If the finalized memory location for the element is occupied, then elements on the high side are moved by incrementing their position in the stored set by one or more memory address increments. Note that a valid bit or an initialization to an otherwise invalid value may bit utilized to indicate whether a target memory location is in use. Each time a local search is conducted to determine whether to store the element at a higher or lower memory address, the list element cell processor can retain knowledge of the bias in the memory address movement and use this knowledge to bias subsequent calculations for the initial memory addresses for insertion of other elements. If the interpolated memory address for an element is not occupied, a local search of the next higher and lower elements is still conducted to confirm the memory address for element storage is in the correct rank order. Otherwise, the memory address will be incremented or decremented to find a proper rank ordered position in memory.

When the first observed instance of an element is stored in its rank ordered position in memory, it is also stored with its positional counter. If additional instances of the element are observed, the list element cell dynamically assigns a memory range to store the counter values for the additional one or more instances of the element. The memory address for these additional instances of the element is stored and the list element cell keeps a running total for the additional observed instances of the element. For example, if the element "7" is placed in a list element cell with an element value range of 1-10, "7" may be placed in a memory table along with its positional counter, for example a counter value of X. If another "7" is in the list, the element is sent to the same list element cell where it is currently stored, where the rank ordering function will determine that "7" is already stored, so the list element cell will dynamically allocate memory to store an additional positional count value for the element "7". If the allocated memory for these positional counters is exceeded, the last entry in the allocated memory will be the memory address of another dynamically created memory range allocated for the element "7". This cascaded memory allocation can occur so long as new instances of the element "7" are observed and memory is available. The memory allocated to store positional count values may include bit fields to distinguish between count values and pointers to additional memory if needed.

When an element is ingested into the list element cell, ranking is based on a defined rule set which defines which elements have higher rank than others. Such rules apply to any character set whether containing symbols or letters of any language. For example, a "0" may have a higher rank than an "a". For this reason, the preferred embodiment provides a character set identifier as part of the metadata for the list of elements, so the list element value ranges can be properly constructed and so that sorting within each list element cell follows defined rules. One example of stored entries for the element 34.7 could appear as: 34.7, 1245, 5, FF35ECB02 which would be interpreted as "the element 34.7 was observed to be the 1245th position in the list and there were five more observations of the same element having positional counters stored at memory location FF35ECB02." One need merely inspect that memory location and read back five entries to know where they occurred in the original list of elements.

FIG. 3 illustrates a list element cell inserting three elements with the values of 5, 7, and 1. The first element of the list "5" is inserted at the memory location indicated along with the positional count value "1" and the additional instances field indicating 0 additional instances. In addition, the memory address field pointing to a location in memory of additional positional count values is null. The second element value received is 7 and the third element value is "1" with the fields entered in the cell storage as indicated. FIG. 3 assumes a second instance of "7" was received in the list as the $114^{th}$ element in the list. As shown, the additional instance field has a 1 and the memory address field point to the location in memory where the positional count information is stored. Inserting an element may require other elements (above or below it) to be incremented/decremented in memory location in a cascaded manner. The interpolation scheme for placement of elements within memory allocated to the list element cell automatically provides gaps so that insertion of new elements minimizes such update cascading. Further, use of memory pointers to additional positional counters minimizes the need to cascade element positions in memory.

The values of the elements in the list may be tightly bunched or scattered over wide ranges, requiring the creation of large numbers of list element cells. If the list's metadata specifies that the element values have a known distribution such as Gaussian or Poisson, the initial set of list element cells may have element value ranges to roughly match the distribution. Conversely, if the data is uniformly scattered, the list element cell management function may allocate the element storage structures with equal sized element value ranges. The value range of the data, e.g., largest and smallest element values, may be supplied with the list.

Assume a value outside any of the ranges currently assigned to the list element cells is received by a CPU from the INGEST function. If the current CPU instructs the list element cell management function 230 to create a new list element cell for an element, the list element cell management function 230 uses defined rules to set the element value range for the newly created list element cell $107_6$. During the creation of this new list element cell, the list element cell management function notifies the INGEST function to suspend dropping any more elements onto the list element communication bus. Immediately after creating the new list element cell, the list element cell management function 230 informs all CPUs about the new list element cell and its assigned element value range. The list element management function 230 may communicate with the CPUs 105 and the INGEST function 103 over the element bus 207 or another communication channel. Then the list element cell management function releases the INGEST function to resume depositing new elements onto the list element communication bus. The list element that caused one of the CPUs to request creation of the new list element cell is now able to identify the new list element cell because the element it is holding is within the element value range of the newly created list element cell. That CPU then deposits its list element and its positional counter in that list element cell and then become available to receive another list element from the list element communication bus from INGEST when selected by the CPU pointer logic. The ability to create a new list element cell assumes an environment, such as a data center, where compute resources are available to be allocated as needed. If no additional resources are available, the ranges of the existing list element cells may be adjusted to accommodate the value of the new element.

Sorting occurs per sorting rules, which permits sorting on any languages, numbers, or character sets that can be numerically represented. Thus, e.g., as shown in FIG. 2, the values 1-10 stored in list element storage structure $107_1$ are, in one sorting rule, considered to be less in value than alphanumeric characters A-J stored in list element storage structure $107_5$.

While the current CPU has been processing a current list element from the list, a next element has been supplied by INGEST onto the element bus 207 for the next CPU to load and process in the same manner as the prior CPU. This loading and processing can occur completely in parallel to the element processing by the prior CPU. In fact, there is nothing to inhibit many CPUs from parallel processing their list elements into appropriate list element cells.

Because there are multiple CPUs operating, contention for resources may occur. For example, when one CPU sends its element to a list element cell, a second CPU may need to temporarily pause and wait its turn if the second CPU also needs to send an element to the same list element cell. The larger the number of list element cells utilized and the more randomized the elements, the lower the likelihood of such pauses due to contention. Note that such pauses do not directly affect the ability of the INGEST function to keep placing list elements onto the element bus 207. INGEST continues to supply list elements as long as there is a CPU available to take the next element.

In the event the CPU identified by the CPU pointer is taking excessive time to toggle the load interrupt line 215, thereby indicating the element has not been received by the CPU, INGEST selects another CPU to load and process the next element, thereby skipping over the CPU taking too long to load the element. For example, assume there are ten CPUs and the fifth one in the set just loaded an element and the pointer now identifies the sixth CPU, but the sixth CPU is still sorting an earlier value into one of the list element storage structures. The INGEST function waits a defined time of, e.g., one microsecond, and if the sixth CPU does not assert the interrupt line to indicate its ability to take the next value, INGEST increments the CPU pointer to the value seven. In that case, the sixth CPU will not get a chance to load another value until the CPU pointer round-robins back to it. That is no problem, because the CPUs are all peer devices, equally able to handle incoming elements.

Consider the less common instance where many or all CPUs are attempting to gain access to a list element cell to send their elements to it. Such contention may be handled by allowing access to each CPU in request order. That is, each CPU effectively "takes a number" as if it was in a waiting room. Each list element cell maintains its own logic, accessible to the CPUs, indicating which CPU is being served and a waiting list of CPUs in order of request. Thus, each list element storage structure has logic providing the function of "now serving CPU number X". In addition, each list element cell may assign counters to CPUs that request access to it, but cannot do so since the list element cell is busy. Such CPUs will be provided numbers X+1, X+2, X+3, etc. When the list element cell is released by a prior CPU and has completed any rank ordering and insertion tasks, the list element cell increments its "now serving CPU X" counter and the CPU with the matching assigned number is permitted to seize the list element cell in order to send its list element. The only time INGEST would ever have to wait to supply another element to the shared bus is when all CPUs are busy inserting their elements into list element storage structures or are waiting in line to do so and cannot handle another element. Embodiments may utilize queues or buffers in each of the CPUs to store elements that cannot be processed immediately by the CPU to minimize occurrence of such waits and to minimize the need to skip over any particular CPU because the CPU is busy. Further, list element cells may also utilize buffers in order to accept elements prior to rank sorting and insertion of previously received elements. Buffers in the CPUs and the list element buffers take advantage of queueing theory to minimize processing delays.

Note that the architecture described herein is highly scalable and contention problems can be mitigated by providing more CPUs and/or by modifying the element value ranges of the list element cells. The latter minimizes the likelihood of CPUs getting in line behind each other and also the time it takes to determine a memory address for an element within the list element cell. As long as there is a single CPU available to receive the next element from the list element communication bus, an additional list element can be processed. The frequency of needing to increment the CPU pointer to skip a CPU can be used to trigger auto assigning additional CPU resources. It will be evident to those skilled in the art that the total processing cost in the plurality of CPUs is substantially less that the processing cost in the list element cells since the CPU task is to determine which list element cells to pass elements to and also conduct some finite buffering of incoming list elements, communicate with the list element cells, and communicate with the list element cell management function. On the other hand, the list element cells not only perform some finite buffering of list elements sent from one or more of the plurality of CPUs, but also estimate the memory location for element storage, perform local memory searches to confirm or modify memory storage location, allocate memory for positional counters, and communication with SENDER.

In addition to the CPUs being able to request allocation of a new list element cell when the element being processed is outside of the element value ranges supported by the existing list element cells, the list element cell monitor function 221 monitors utilization of the list element cells 107 to determine, e.g., if one of the list element cells is filling up much faster than others of the list element cells. If one list element cell is being used more heavily than other list element cells, that can result in delays as the CPUs have to wait for access to the heavily used list element cells. For example, assume that list element cell $107_3$ has stored 80% of the elements at a particular point in the sorting process. If so, then the list element cell monitor function 221, may request the list element management function 230 split list element cell $107_3$ into two list element cells so list element cell $107_3$ holds values 21-25 and a new list element cell is allocated to hold values 26-30 to thereby reduce the demand for the list element cell. Alternatively, the monitor function 221 may request that the management function 230 adjust the element value ranges of the existing list element cells so that underutilized list element cells incorporate a portion of the element value range supported by list element cell $107_3$. The list element cell monitor function 221 may observe bus 222 to determine which list element cells are being utilized. Alternatively, the number of entries may be tracked by each list element cell and reported to the monitor function or read by the monitor function. From the reported information, the list element cell monitor function may monitor the fullness of each list element cell. For example, if 90% of the elements in any particular element value range are utilized, the element value ranges may be reallocated to be smaller to reduce the possibility of contention between CPUs for access to any particular list element cell. The list element cell monitor function may be implemented as an independent programmed processing unit, or as part of another processing unit in the sorter apparatus. In addition, the monitor function may be combined with the list element management function in embodiments.

The sorting architecture described herein is akin to planning communications resources in an Erlang C model, which is an "all blocked calls queued" scheme. For embodiments of the sorting apparatus described herein, a busy CPU is analogous to a busy radio and a different radio can be assigned to service a call. When all radios are busy, a non-clearable blocking event occurs. Like radios, there is a non linear increase in throughput of the group resource with increasing numbers of CPUs. The same is true for the number of list element cells created based on the allowed element value ranges for each of them.

After the last list element is supplied by INGEST and after the last CPU has processed its element into its required list element cell, then the SENDER function can send a sorted list (rank ordered list) back to the requesting computer system. The SENDER function can be implemented as a separate CPU, or as part of a processor handling the INGEST function and/or the CPU pointer functions. The SENDER scans the element value ranges of list element cells and orders them using the rank order rules for the type of data being sorted. The element value ranges of the list element cells may be maintained by the list element cell management function 230 or in a predefined location in the list element cells or both. SENDER then reads the rank ordered, stored elements from each list element cell along with all associated positional counters for each element. SENDER recovers from each list element cell in sequence all of the elements contained in the list element cell. Since the list elements in each list element storage structure were inserted in proper order by the CPUs during processing, there is no need for additional sorting. SENDER merely appends the elements into what will necessarily be a rank ordered list for transmission. After the last list element cell provides its ordered elements, SENDER finalizes the ordered file and returns it to the requesting computer system. SENDER may also return the counter numbers associated with each list element, so as to maintain positional integrity of each element from the original list sent by the requesting computer system. Note that some embodiments may not request positional integrity information be provided. In such cases, a list element cell may store the element and how many times the value of the element occurred in the list. In such cases, the list element cells do not need to allocate memory for storing additional positional counters, but still would need to increment and store the count of observations of the elements. Once all ordered elements are returned by SENDER to the requesting computer system and acknowledgement of receipt therefrom is complete, the apparatus may reset. Embodiments may require that any new request from a computer system be preambled with a reset command. Some embodiments may utilize both resets.

Various algorithms used today also provide metrics such as median, mean or mode. The apparatus can provide all three of these. Since the list length may be known from the start of processing, or based on a count of the list elements performed by the INGEST function, to get the median value all the apparatus has to do is monitor how many elements are returned in the ordered list and capture the central element or pair of elements (if the list has an even number of elements) and then send that element (or elements) as the median. To find the average, the INGEST function 103 may sum all incoming values as they arrive and divide the total by the list length, which may be provided at the start of the process by the requesting system or determined by the INGEST function. To find the mode, in an embodiment each list element cell separately stores the number of instances of each element. This equals the first observation plus the incremented number of additional instances for which positional counters are stored in dynamically allocated memory. Upon SENDER 117 reading each list element storage structure, SENDER determines which of the list element storage structure modes has the highest count and then provides that highest count as the mode of the list. If the highest count is shared by more than one list element storage structure and/or more than one list element in a list element storage structure, the SENDER can declare a multimodal list and provides the modes. This embodiment also allows the SENDER to identify multiple of the top modes so as to rapidly identify a bi-modal, tri-modal, or X-modal distribution.

As disclosed, the end-to-end processing effort requires only loading a set of values into the apparatus and then for the SENDER to read off the sorted list with retained positional integrity (if desired) and send it back to the requesting computer system.

Figure 4:
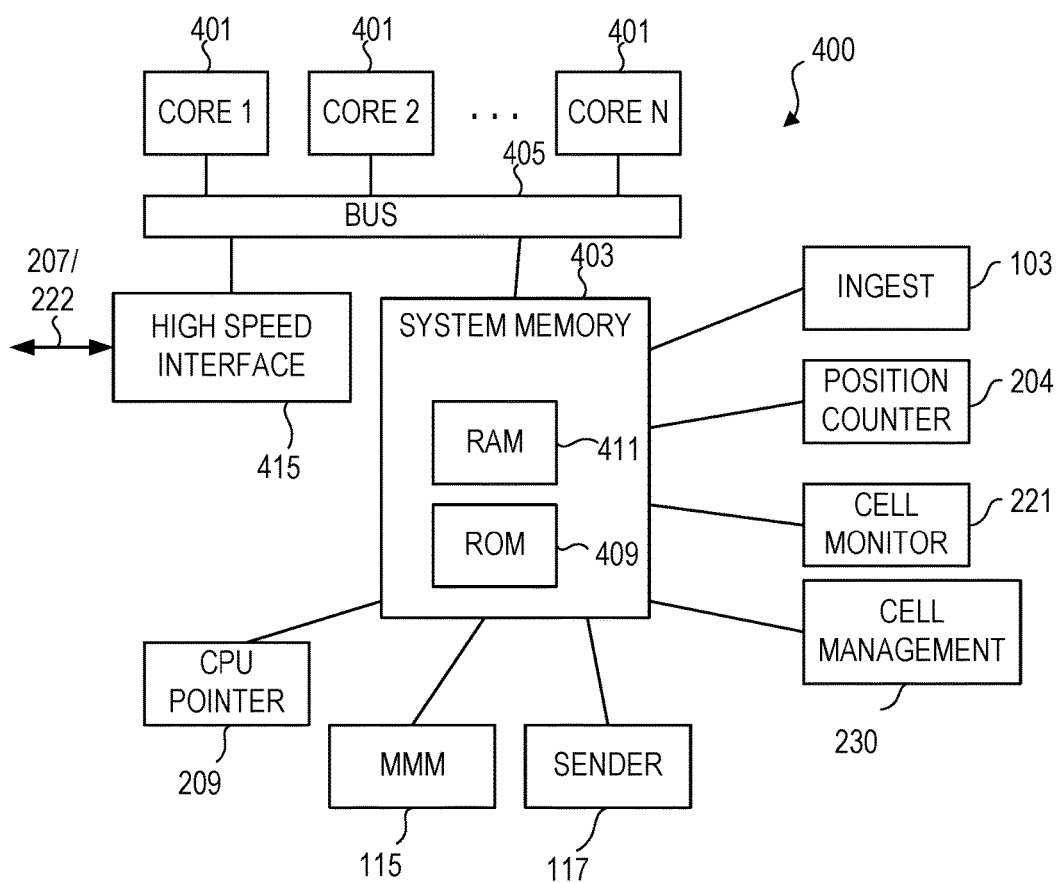
FIG. 4 illustrates a high level block diagram of an embodiment of a processor system that may be used in one or more embodiments.

FIG. 4 illustrates a high level block diagram of an example processor system 400 operable to perform the sorting and associated functions described herein. The following description in conjunction with FIG. 4, is intended to provide a brief, general description of a suitable processing system 400, which can be used with one or more embodiments described herein. With reference again to FIG. 4, the processor system 400 includes one or more processing cores 401, a system memory 403 and a system bus 405. Other functions described herein, including cell monitoring, cell management, INGEST, pointer, SENDER, MMM, may be implemented on one or more processing systems 400. For example, cell monitoring and cell management may be implemented in software modules operating on separate cores within the same processor system 400. In an embodiment, each core is allocated a range of values to sort and associated list cell functions including sorting, memory allocation, communication, maintaining utilization statistics, and other tasks relevant to a list element cell. In other embodiments, multiple cores are utilized to implement a list element cell. The system bus may be used to couple various system components including, but not limited to, the system memory 403 to the cores 401. In an embodiment system memory 403 represents a portion of system memory available to a particular system 400. Cores 401 may include cache memory and the cache memory and/or portions of system memory 403 may be used to provide the element storage. Program modules, which are computer-executable instructions that operate on one or more of the cores 401 may be used to implement the functions described herein. Generally, program modules include routines, programs, components, data structures, etc., that perform particular tasks. The system bus 405 can be any of several types of bus structures that can further interconnect to a memory bus (with or without a memory controller), a peripheral bus, and a local bus using any of a variety of commercially available bus architectures. The system memory 403 may include nonvolatile memory 409 and volatile memory 411. A basic input/output system (BIOS) can be stored in the non-volatile memory such as ROM, erasable programmable read only memory (EPROM), EEPROM, which BIOS contains the basic routines that help to transfer information between elements within the processor, such as during startup. As used herein, terms such as "memory", "storage," "data storage," and substantially any other information storage component relevant to operation and functionality of a component, refer to any form of memory that can store information and be read by computers or processors or other electronic components. Memory may be volatile memory or nonvolatile memory, or both.

The processor system 400 also includes one or more external interfaces 415 to couple to, e.g., other processors in the system. Thus, interface 415 may provide an interface to bus 207 for the INGEST function 103 and the CPUs 105. For the list element cells 107, the interface may provide an interface to bus 222. More than one interface may be utilized in any instantiation of processor system 400 to communicate with various logic within the sorter 100. In addition, a high speed switch fabric, not shown in FIG. 2, may be utilized to communicate between functions implemented in different processor systems. In embodiments, the bus 207 may be implemented as multiple point to point high speed interconnects such as a HyperTransport (HT) link. In such case, the INGEST logic 103 may have multiple HT links. The toggle bus 215 may be implemented as a separate line signal line or as messages sent over the communication link being utilized in the particular embodiment. Other communication channels and technologies are within contemplation of the embodiments described herein and may be utilized as needed in various embodiments. The systems and methods described herein can be implemented utilizing various commercially available operating systems or combinations of operating systems.

Note that the terms "first," "second," "third," and the like, as used in the claims does not typically indicate or imply a particular temporal order. For example, "a first action," "a second action," and "a third action," indicates three actions and not a particular order of the actions.

Thus, aspects of a sorter have been described. The description set forth herein is illustrative, and is not intended to limit the scope of the following claims. Variations and modifications of the embodiments disclosed herein may be made based on the description set forth herein, without departing from the scope and spirit of the following claims.

What is claimed is:

1. A sorting apparatus to sort a list of elements comprising:
   ingest logic to receive the list of elements to be sorted;
   a plurality of processing units;
   a communication channel to supply elements of the list from the ingest logic to the processing units;
   select logic coupled to select one of the plurality of processing units as a selected processing unit to process an element of the list supplied from the ingest logic to the communication channel; and
   a plurality of list element cells, coupled in parallel to the plurality of processing units, each of the list element cells to rank order sort and store information associated with a different range of list element values, each of the list element cells having associated storage to store the information;
   wherein each of the list element cells has an element value range and stores elements having a value encompassed by the element value range; and
   wherein the information includes an indication of a number of times elements with an identical value appear in the list.

2. The sorting apparatus as recited in claim 1 wherein the information further includes a first list location indication indicating where a first element originally appeared in the list and a second list location indication for a second element of the list, the second list location indication indicating where the second element originally appeared in the list.

3. The sorting apparatus as recited in claim 2 further comprising:
   a counter that increments for each element of the list supplied over the communication channel; and
   wherein respective count values of the counter are supplied over the communication channel to provide the first list location indication and the second list location indication.

4. The sorting apparatus as recited in claim 1 wherein the one of the processing units supplies an indication that the one of the processing units has ingested the element of the list.

5. The sorting apparatus as recited in claim 4 wherein the ingest logic is responsive to the indication to place a next element of the list on the communication channel.

6. The sorting apparatus as recited in claim 4 where the select logic selects another of the processing units to process a next element of the list responsive to the selected processing unit providing the indication.

7. The sorting apparatus as recited in claim 1 wherein the associated storage further includes a first positional storage location to store a first positional list location indicating where a first element of the list originally appeared in the list.

8. The sorting apparatus as recited in claim 7 wherein the associated storage stores a memory pointer to another memory location storing a second positional list location indicating a second original list location for a second element of the list having an identical value to the value of the first element of the list.

9. The sorting apparatus as recited in claim 1 further comprising monitor logic to monitor filling of the list element cells.

10. The sorting apparatus as recited in claim 1 further comprising list element storage allocation logic to divide the one of the plurality of the list element cells into multiple list element cells responsive to the one of the list element cells filling faster than one or more others of the list element cells.

11. A method for sorting a list of unsorted elements comprising:
receiving the list to be sorted;
supplying an element of the list over a communication channel to a selected one of a plurality of processing units to process an element of the list;
the selected one of the processing units storing information associated with the element of the list in one of a plurality of list element cells, each of the plurality of list element cells storing information associated with a different range of list values, the one of the plurality of list element cells having an element value range that encompasses a value of the element of the list; and
storing an indication of an original list location associated with the element of the list in the one of the list element cells along with the value, the original list location being the original list location in the list of unsorted elements.

12. The method as recited in claim 11 further comprising the one of the processing units supplying an indication that the one of the processing units has ingested the element of the list.

13. The method as recited in claim 12 further comprising ingest logic, responsive to the indication, placing a next element of the list on the communication channel.

14. The method as recited in claim 11 further comprising:
incrementing a counter for each element of the list supplied over the communication channel; and
supplying a count value of the counter with each element of the list supplied over the communication channel, the count value corresponding to an original position of each element in the list.

15. The method as recited in claim 11 further comprising the one of the list element cells storing a pointer to another memory location storing another original list location for another element of the list having an identical value to the value of the element of the list.

16. The method as recited in claim 11 further comprising using the value of the element of the list as an index to a location in the one of the list element cells.

17. The method as recited in claim 11 further comprising monitoring filling of the list element cells to determine if one of the list element cells is filling faster than at least another of the list element cells.

18. The method as recited in claim 11 further comprising splitting the one of the plurality of the list element cells into multiple list element cells responsive to the one of the list element cells filling faster than one or more other list element cells.

19. The method as recited in claim 11 further comprising another of the processing units allocating another list element cell responsive to a value of another element of the list being processed by the other of the processing units not being within the element value range of the one of the plurality of list element cells.

20. The method as recited in claim 11 further comprising selecting a processing unit as the selected one of the plurality of processing units if another of the processing units does not respond to being selected within a predetermined time period.

21. A sorting apparatus to sort a list of elements comprising:
a plurality of list element cells, each of the list element cells to store information associated with a different range of list element values;
a plurality of processing units coupled to the plurality of list element cells, each of the list element cells accessible by each of the processing units;
a communication channel to supply elements of the list to the processing units;
select logic coupled to select respective ones of the processing units to process respective elements of the list supplied to the communication channel;
monitor logic to monitor utilization of the list element cells to allocate additional list element cell storage when the utilization indicates one of the list element cells is being utilized by a predetermined amount more than one or more of others of the list element cells;
a counter that increments for each element of the list supplied over the communication channel; and
wherein a count value of the counter is supplied with each element of the list supplied over the communication channel, the count value corresponding to an original position of each element in the list of elements.

* * * * *